July 13, 1954 W. BALTZ Re. 23,849

SUSPENDED HORSE

Original Filed March 29, 1945

INVENTOR.
WILLIAM BALTZ

BY Victor J. Evans & Co.
ATTORNEYS

Reissued July 13, 1954

Re. 23,849

UNITED STATES PATENT OFFICE 23,849

SUSPENDED HORSE

William Baltz, Pocahontas, Ark.

Original No. 2,437,015, dated March 2, 1948, Serial No. 585,558, March 29, 1945. Application for reissue April 16, 1954, Serial No. 423,869

2 Claims. (Cl. 272—52)

Matter enclosed in heavy brackets [ ] appears in the original patent but forms no part of this reissue specification; matter printed in italics indicates the additions made by reissue.

This invention relates to a suspended hobby horse and more particularly to that type of hobby horse that will give a rocking motion as well as a swaying motion.

An object of the invention being to provide a hobby horse that tilts to either side up to a 45° angle at the same time it is doing a galloping or bucking.

Another object of the invention is to provide a hobby horse that will not fall off balance no matter at what angle the hobby horse is suspended.

This invention is capable of simulating more nearly the actions of a horse, thereby creating more amusement for children than those in use at the present time. It is safe and dependable and can be used by children of all ages.

This invention also embodies other objects and advantages which will be apparent during the course of the following description:

In the accompanying drawings forming a part of this specification and in which like numerals are employed to designate like parts throughout the same:

Figure 1:
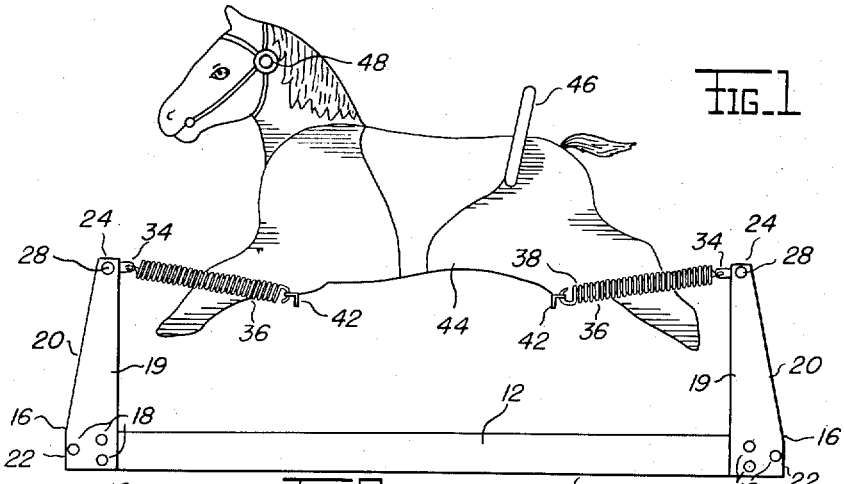
Figure 1 is a side elevation of an embodiment of the invention.

Referring more in detail to the drawings, the reference numeral 10 indicates the rectangular base of the device which is composed of side rails 12 and end rails 14 joined at their ends to uprights 16 by any well known fastening means 18.

The uprights 16 have an inner straight side 19 and an upwardly inclined outer side 20 so that the lower end 22 is of a greater width than the upper end 24.

The uprights 16 are provided adjacent the upper ends 24 thereof with openings 26 which are adapted to receive bolts 28 therein.

The bolts are adapted to be received in an opening 30 in one end of the spring supporting plate 32.

The other end of the plate 32 is provided with an opening 34 to receive and support one end of a coil spring 36.

The other end of the coil spring 38 is received in openings 40 in the angle irons 42.

The structure as described comprises four uprights 16 and springs 36 and two angle irons 42. An artificial horse 44 is secured to the angle bars 42 in such a fashion that the angle bars 42 are at right angles to the artificial horse 44.

Figure 2:
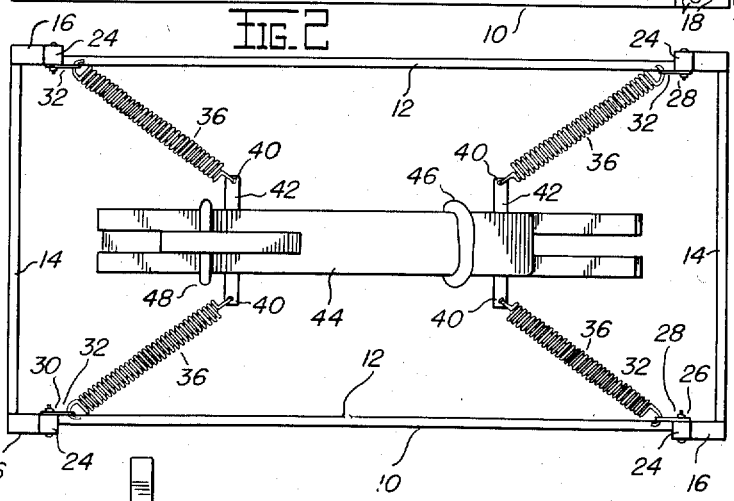
Figure 2 is a top plan view thereof.
Figure 3:
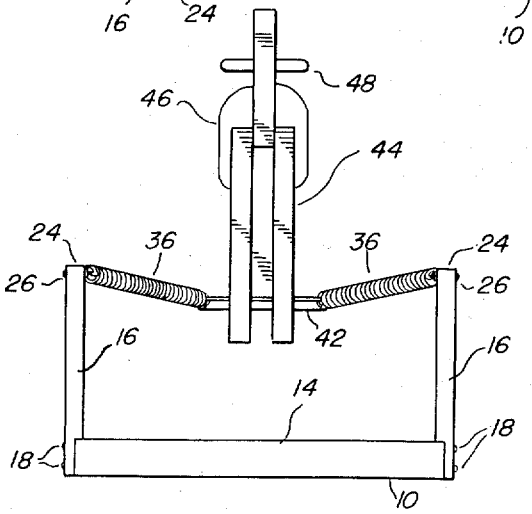
Figure 3 is a rear view of the same.

*Thus, as viewed in Figure 2, the springs 36 lie at an angle to said bars 42 other than a straight*

*angle, such that the springs of one set of springs act in substantial opposition to the springs of the other set of springs to resiliently resist rocking and swaying movements and thereby stabilize the action of the horse under the forces applied thereto by the rider. Such stabilization is particularly required, where, as in the present structure, the respective points of connection of the opposite ends of the springs 36, with the bars 42 and with the plates 32 are substantially at the same level when the horse is unburdened by a rider and therefore the mass of the horse is carried above said springs.*

The bars 42 will act as foot rests and the horse 44 is provided with a seat 46 and a hand hold 48.

*By shifting his weight alternately or in any desired sequence from the seat to the hand hold, or to the foot rests, the rider can get the action of the horse that he desires.*

It is obvious that by suspending the horse 44 as shown, a rocking motion as well as a swaying motion can be imparted thereto.

It is believed that the operation of the device will be obvious and that a more detailed explanation thereof is not necessary to those skilled in the art.

It is to be understood that the form of the invention herewith shown and described is to be taken as a preferred example of the same and that various changes relative to the shape, size, material and arrangement of parts may be resorted to without departing from the spirit of the invention or the scope of the appended [claim] *claims.*

Having thus described the invention, what is claimed as new and desired to be secured by Letters Patent is:

1. A device of the character described, comprising a rectangular base having opposed side rails and end rails intermediate the ends of said side rails, uprights secured to said base on the outer surface of said side rails at the four corners of said base, said uprights having a straight side and an inclined side and the bottom of the upright is of a greater thickness than the top thereof, plates secured to the inner top edge of said uprights, coil springs having one end thereof secured to said plates, an artificial horse, plates secured to said horse at right angles thereto, the opposite ends of said springs connected to said plates at an angle thereto and adapted to support said horse thereby with relation to said uprights.

*2. A device of the character described, com-*

*prising a rectangular base having opposed side rails and end rails secured to said side rails to lie intermediate the ends thereof, uprights secured to said base on the outer surface of said side rails at the four corners of said base, said uprights having a straight side and an inclined side and the bottom of the upright being of a greater thickness than the top thereof, first plates secured to the inner top edge of said uprights, coiled springs having one end thereof secured to said plates, an artificial horse, second plates secured to the lower portion of said horse at right angles thereto, the opposite ends of said springs being connected to said second plates at an angle thereto, the points of connection of said springs*

*to said first and second plates being at substantially the same level when the horse is unburdened whereby the mass of said horse is carried above said supporting springs.*

References Cited in the file of this patent or the original patent

UNITED STATES PATENTS

| Number | Name | Date |
|---|---|---|
| 284,940 | Bean et al. | Sept. 11, 1883 |
| 385,792 | Crandall | July 10, 1888 |
| 1,468,993 | Converse | Sept. 25, 1923 |
| 1,950,042 | Upper | Mar. 6, 1934 |
| 2,020,811 | Thomas | Nov. 12, 1935 |